Dec. 2, 1969  W. H. BUCHSBAUM  3,482,243
PROTECTIVE SYSTEM
Filed Oct. 28, 1966  2 Sheets-Sheet 2

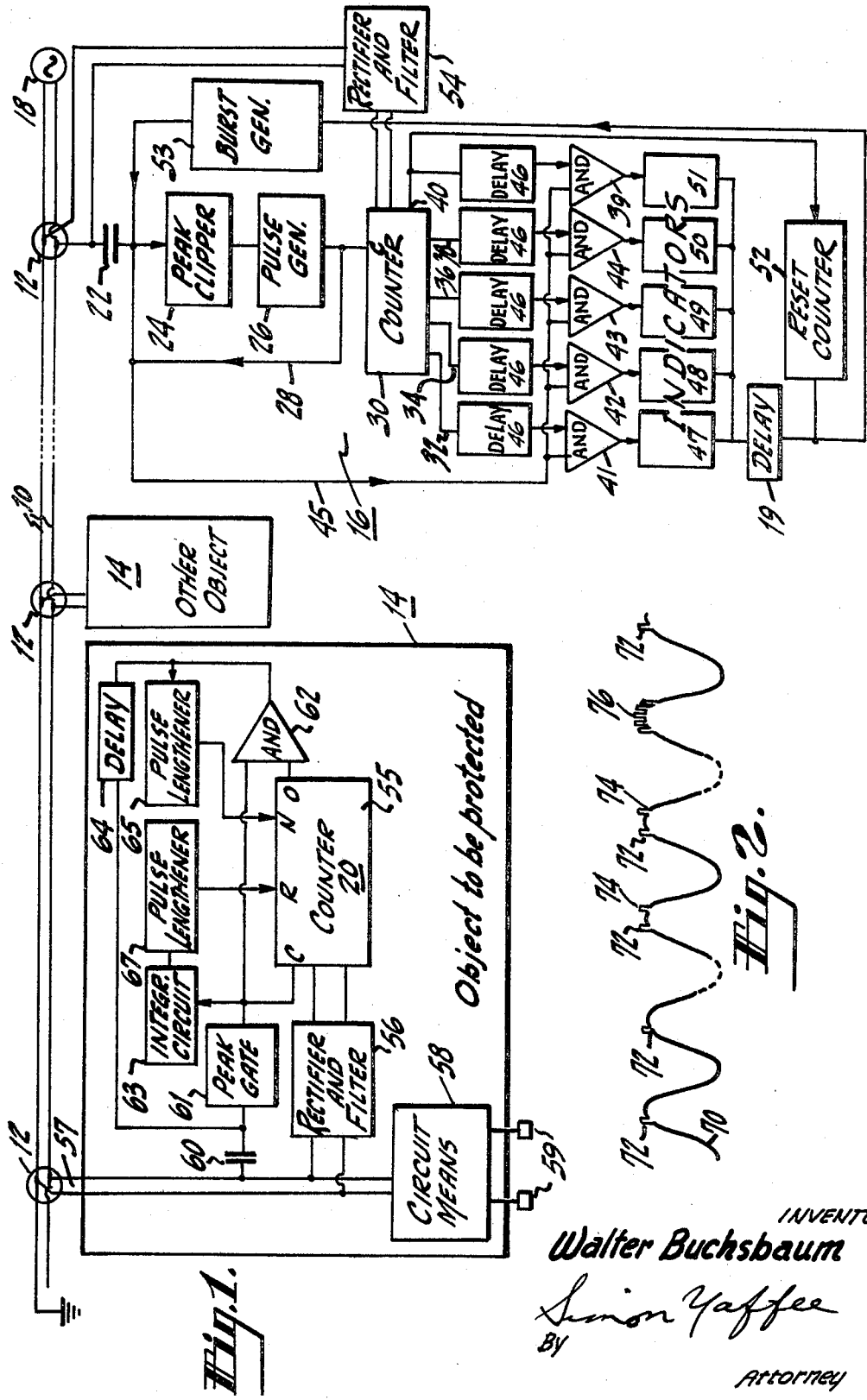

| Fig. 3. | 1ST PULSE | 2nd | 3rd | 4th | 5th | 6th | 7th | 8th | X+1 PULSE | X+1 | X+2 | X+3 | X+4 | X+5 | X+6 | X+7 | 2X | 2X+1 | 2X+2 | 2X+3 | 2X+4 | 2X+5 | 2X+6 | 2X+7 | 3X | 3X+1 | 3X+2 | 3X+3 | 3X+4 | 3X+5 | 3X+6 | 3X+7 |
|---|---|---|---|---|---|---|---|---|---|---|---|---|---|---|---|---|---|---|---|---|---|---|---|---|---|---|---|---|---|---|---|---|
| INQUIRY PULSES | 1 | 2 | 3 | 4 | 5 | 6 | 7 | 8 | RESET | 1 | 2 | 3 | 4 | 5 | 6 | 7 | RESET | 1 | 2 | 3 | 4 | 5 | 6 | 7 | RESET | 1 | 2 | 3 | 4 | 5 | 6 | 7 |
| FIRST PROTECTIVE UNIT | 1 | 2 | 3 | 4 | 5 | 6 | 7 | 8 | REPLY | 9 | 10 | 11 | 12 | 13 | 14 | 15 | 8 | 9 | 10 | 11 | 12 | 13 | 14 | 15 | REPLY | 9 | 10 | 11 | 12 | 13 | 14 | 15 |
| 2nd PU | 1 | 2 | 3 | 4 | 5 | 6 | 7 | 8 | 9 | REPLY | 10 | 11 | 12 | 13 | 14 | 15 | 8 | 9 | 10 | 11 | 12 | 13 | 14 | 15 | 8 | 9 | 10 | 11 | 12 | 13 | 14 | 15 |
| 3rd PU | 1 | 2 | 3 | 4 | 5 | 6 | 7 | 8 | 9 | 10 | REPLY | 11 | 12 | 13 | 14 | 15 | 8 | 9 | 10 | REPLY | 12 | 13 | 14 | 15 | 8 | 9 | 10 | 11 | 12 | 13 | 14 | 15 |
| 4th PU | 1 | 2 | 3 | 4 | 5 | 6 | 7 | 8 | 9 | 10 | 11 | REPLY | 12 | 13 | 14 | 15 | 8 | 9 | 10 | 11 | REPLY | 13 | 14 | 15 | 8 | 9 | 10 | 11 | 12 | 13 | 14 | 15 |
| 5th PU | 1 | 2 | 3 | 4 | 5 | 6 | 7 | 8 | 9 | 10 | 11 | 12 | REPLY | 13 | 14 | 15 | 8 | 9 | 10 | 11 | 12 | REPLY | 14 | 15 | 8 | 9 | 10 | 11 | 12 | 13 | 14 | 15 |
| 6th PU | 1 | 2 | 3 | 4 | 5 | 6 | 7 | 8 | 9 | 10 | 11 | 12 | 13 | REPLY | 14 | 15 | 8 | 9 | 10 | 11 | 12 | 13 | REPLY | 15 | 8 | 9 | 10 | 11 | 12 | 13 | REPLY | 15 |
| 7th PU | 1 | 2 | 3 | 4 | 5 | 6 | 7 | 8 | 9 | 10 | 11 | 12 | 13 | 14 | REPLY | 15 | 8 | 9 | 10 | 11 | 12 | 13 | 14 | REPLY | 8 | 9 | 10 | 11 | 12 | 13 | 14 | REPLY |
| 8th PU | 1 | 2 | 3 | 4 | 5 | 6 | 7 | 8 | 9 | 10 | 11 | 12 | 13 | 14 | 15 | REPLY | 8 | 9 | 10 | 11 | 12 | 13 | 14 | 15 | REPLY | 9 | 10 | 11 | 12 | 13 | 14 | 15 |

Fig. 4.

LET X BE 8, THEN FOR THE FIRST PROTECTIVE UNIT X+A = 9 AND $S_1$ = 1 WHEREBY X+A−$S_1$,
" " 2nd " " X+B = 10 " $S_2$ = 2 " X+B−$S_2$,
" " 3rd " " X+C = 11 " $S_3$ = 3 " X+C−$S_3$,
" " 4th " " X+D = 12 " $S_4$ = 4 " X+D−$S_4$,
" " 5th " " X+E = 13 " $S_5$ = 5 " X+E−$S_5$,
" " 6th " " X+F = 14 " $S_6$ = 6 " X+F−$S_6$,
" " 7th " " X+G = 15 " $S_7$ = 7 " X+G−$S_7$,
" " 8th " " X+H = 16 " $S_8$ = 8 " X+H−$S_8$.

INVENTOR
Walter Buchsbaum
By Simon Yaffee
Attorney

United States Patent Office 3,482,243
Patented Dec. 2, 1969

3,482,243
PROTECTIVE SYSTEM
Walter H. Buchsbaum, Forest Hills, N.Y., assignor to
RCA Corporation, a corporation of Delaware
Filed Oct. 28, 1966, Ser. No. 590,343
Int. Cl. G08b 25/00; H04q 9/00; H04m 11/04
U.S. Cl. 340—408                                    5 Claims

ABSTRACT OF THE DISCLOSURE

A protective system in which a central station connected to a power line supplies an inquiry pulse at a predetermined phase relation to a power wave on the line and recognizes reply pulses which are applied from a protected apparatus to the power wave on the line at another phase relation thereto as long as the protected unit is connected to the power line.

---

This invention relates to an improved protective system for indicating the removal of a protected object.

Valuable objects such as television receivers are frequently stolen from hotel or motel rooms. It is therefore advantageous to provide protective means for indicating the removal of such an object. Known protective systems include a protective wire for each protected object, the wire being connected to the power supply wiring of the room through the lead line for the object, and to an indicator at a central location such as the hotel or motel office. When the lead line plug is removed from its receptacle preparatory to removing the protected object, the electrical power is disconnected from the protective wire and the condition of the indicator changes, indicating the removal of the object. However, such a protective system requires as many wires as there are objects to be protected, resulting in a large cable. Also, such a protective system can be circumvented by connecting the protective wire to the power source outside of the object before the plug is withdrawn from the receptacle, whereby there will be no indication at the centrallocation that the protected object has been removed.

It is an object of this invention to provide an improved object protective system.

It is a further object of this invention to provide an objective protective system requiring no special additional wiring in the establishment containing the protected objects.

It is another object of this invention to provide a protective system that is difficult to circumvent.

It is still a further object of this invention to provide a protective system which indicates the absence of a protected object and which is operative with or without the provision of a means for providing synchronizing signals.

In accordance with the invention, each of the protected objects is provided with a respective protective unit. Means are provided to produce inquiry pulses and to send the same inquiry pulses to all the protective units over a previously installed electrical power line. Each protective unit counts all the inquiry pulses applied thereto, and sends out a reply pulse over the electrical power line after having counted a number of pulses characteristic of the counter, this number being different for each protective unit. The reply pulse is transmitted to a sensor positioned at a central location over the power line. The reply pulse is also applied to the counter in the protective unit to set a starting number into it and in the protective unit to set a starting number into it that is individual for the several protective units. This starting number is so chosen for each protective unit that the difference between the counted number required to cause the production of a reply pulse and the starting number is the same for all protective units. If the highest counted number is greater than the number of objects to be protected, then it is not necessary to send a synchronizing or reset pulse over the power lines to cause the reply pulses from the several protected objects to fall into respective time slots.

However, on certain occasions, as when the system is started or restarted, or when a protected object is added or removed or to provide periodic checks of the proper operation of the system, it is desirable to resynchronize the protective system. Therefore, according to another feature of the invention, means are provided to supply synchronizing pulses and other means are provided which are responsive to the synchronizing pulses to reset the protective system.

Since the inquiry pulses are derived from the power wave on the electrical power line, the described system is inherently adapted to be used with power waves of any frequency and also momentary failure of the power supply does not throw the system out of synchronization.

The sensor indicates if a reply pulse is received in a time slot, whereby the absence of an indication in a particular time slot indicates that a corresponding protected object has been disconnected from the power line. Since no protective wire is evident, the person removing the protected object will not be warned. Since to circumvent the protective system of this invention a pulse must be transmitted in a particular time slot, a person will have great difficulty circumventing the protective device even when he notes the presence of one. If desired, the inquiry pulse transmitter and the reply pulse sensor and indicator may be combined. To minimize electrical interference and to aid in separating inquiry pulses from reply pulses, the inquiry and reply pulses may be put on the power supply wave at predetermined, different phase relations therewith.

The invention will be more fully understood upon reading the following description in connection with the accompanying drawing in which:

FIGURE 1 is a schematic circuit diagram of one embodiment of a protective system according to this invention, FIGURE 2 is a curve which is useful in explaining the operation of the circuit diagram of FIGURE 1, and FIGURES 3 and 4 are charts which are useful in explaining the operation of the circuit diagram of FIGURE 1.

A building containing the protected object will have the usual power lines 10 therein, and the usual receptacles 12 connected to the power lines 10. These receptacles 12 are positioned at several locations including the rooms that contain the protected objects 14 and the central location that contains the combined inquiry pulse transmitter and reply pulse sensor 16. A power supply 18, which applies alternating current (A.C.) at any convenient voltage and at any convenient frequency is connected to the line 10. Each object 14 to be protected contains a protective unit 20, however there need be but one sensor unit 16 for a plurality of protective units 20.

The sensor and transmitter unit 16 comprises a capacitor 22, one terminal of which is connected to the ungrounded wire of the power line 10. The other terminal of the capacitor 22 is connected to a peak clipper 24 whose output is applied to a pulse generator 26, whereby an inquiry pulse is produced by the pulse generator 26. Since the inquiry pulses are produced from the wave appearing in the power line 10, no inquiry pulses will be produced unless power appears on the power line 10. Furthermore, one inquiry pulse will be produced for each power pulse, whereby the described protective system can be used with A.C. power of any frequency. The inquiry pulse produced by the pulse generator 26 is applied through the capacitor 22, back to the power line 10, by means of a conductor 28. One inquiry pulse 72 is produced for each cycle of the power wave 70 (see FIGURE 2) and at a desired phase relation therewith, for example, at or just before the positive peak of the power wave 70. Each inquiry pulse is also applied to a counting terminal C of a counter 30 which counts as many pulses as the number of protective units to be used in the system, the counter 30 being reset to zero by the next inquiry pulse applied thereto after the counter is full. The counter 30 has several time slot output terminals 32, 34, 36, 38 and a time slot and reset output terminal 40. While only five time slot output terminals 32, 34, 36, 38, 40 are shown in the drawing, there will be as many thereof as the number of protective units that can be accommodated by the system. The counter output terminals 32, 34, 36, 38 and 40 provide successive timed output pulses corresponding to successive time slots. The pulse at the output terminal 40 appears each time the counter 30 resets itself.

The terminals 32, 34, 36, 38, 40 are connected through respective delay circuits 46 to an input terminal of respective AND circuits 41 through 44 and 39. A lead 45 is connected from the junction of the capacitor 22 and the peak clipper 24 to the other input terminal of all the AND circuits 41 through 44 and 39 for the application thereto of reply pulses as will be explained. The output terminals of each of the AND circuits 41 through 44 and 39 are connected to a respective indicator 47 through 51. The output terminal 40 of the counter 30 is also connected to a reset counter 52 whose output is connected through a delay circuit 19 to the indicators 47 through 51, for the purpose of resetting the indicators 47 through 51 after a number of indicating cycles as will be explained. The output of the reset counter 52 is also shown as connected to a burst generator 53 whose output, comprising the burst pulses 76 (see FIGURE 2), is connected to the junction of the capacitor 22 and the peak clipper 24. The leads leading to the receptacle 12 at the central sensor unit 16 may also be connected to a rectifier and filter 54 which supplies proper direct current to all parts of the sensor unit 16 requiring power. While connections from the rectifier and filter 54 are shown only to the counter 30 to avoid complication in the drawing, it is understood that other connections to the remaining circuit components as described would be made in a conventional manner.

The object to be protected 14, as stated above, includes a protective circuit 20 and also the operating circuit means 58 of the object 14. For example, the object 14 may be a television receiver, in which case the rectangle 58 represents the operating circuit of a television receiver. Obviously, the operating circuit 58 could be that of a refrigerator, freezer, air conditioner or similar electrical appliance, or, the protective circuit may be mounted on any valuable object whether the object includes an electric load or not. The circuit means 58, when included, has its own controls 59, 59 including an on-off switch. The circuit means 58 is plugged into a receptacle 12 of the power line 10 in the usual manner by means of an input lead 57. A rectifier and filter 56 for the protective unit 20 is connected to the leads 57 to be energized by the power lines as long as the leads 57 are electrically connected to the line 10 and indpendently of the off-on switch of the circuit means 58. The output from the rectifier and filter 56 powers the counter 55 comprising part of the protective circuit 20 and all other parts of the protective circuit 20 that require a power supply.

The protective unit 20 also includes a capacitor 60, one terminal of which is connected to that one of the leads 57 which is connected to the ungrounded wire of the power line 10. The other terminal of the capacitor 60 is connected to a peak gate 61 which permits only the inquiry pulses 72, the burst pulses 76, and reply pulses 74 from other protective units 20 formed in a manner to be described (see FIGURE 2) to get through to its output. The output of the peak gate 61 is connected to a counting input terminal C of the counter 55, to the input of an integrating circuit 63 and also to one terminal of an AND circuit 62. The output terminal O of the counter 55 is connected to the other input terminal of the AND circuit 62 and the output of the AND circuit 62 is connected through a pulse lengthener 65 to a set terminal N of the counter 55 and also to the input terminal of a delay circuit 64. The output of the delay circuit 64, which comprises the reply pulse 74, see FIGURE 2, is connected through the capacitor 60 and the leads 57 back to the power line 10. This output reply pulse 74 appears on the power wave 70 and at a predetermined phase relation to the inquiry pulse 72 as shown in FIGURE 2. The output of the integrator 63 is applied to a reset terminal R of the counter 55 through a pulse lengthener 67 for a purpose to be explained. The reply pulse 74 when produced is applied to all circuits plugged into the line including all protective circuits 20 and to the sensor and transmitter 16.

Since both the sensor unit 16 and the protective unit 20 are sensitive only to pulses appearing during a limited portion of a power cycle, the sensitivity of the described protective system to the occurrence of transient or noise pulses is reduced.

In explaining the operation of the described protective system, it is first noted that the counters 30 and 55 count all the inquiry pulses 72 applied thereto. While an inquiry pulse 72 and a reply pulse 74 will be applied to each counter 30 and 55 during many of the cycles of the power wave 70, the counters are designed to respond to only one of these pulses per cycle. The counters 30 and 55 each provide an output pulse or reply pulse when full.

The counter 55 of each protective device 20 is filled by a different number of inquiry pulses received over the power line 10 than the counter 55 of any other protective device 20. The output or reply pulse is sent out on the power line 10 by way of the delay circuit 64, the capacitor 60 and the lead 57. The delay circuit 64 causes the reply pulse 74 to be delayed with respect to the inquiry pulse 72 as indicated in FIGURE 2. The output or reply pulse at each protective device 20 is also applied to the set connection N of the counter 55 of that protective device 20 to set into the counter 55 a starting number which is different for each protective device. The starting number is so chosen that the difference at each protective device 20 of the number that fills the counter 55 thereof and the starting number is the same for all the protective devices, for a purpose to be explained. The burst of pulses 76 when applied to the integrator 63 produces an output pulse which is applied through the pulse lengthener 67 to the reset terminal R of the counter 55 to reset it at zero.

A reply pulse 74 generated by the counter 55 of a protective device 20 is received at the sensor 16 and is applied through the capacitor 22 to all the AND circuits 41 through 44 and 39. The counter 30 applies pulses in succession, that is, in successive time slots through a respective delay circuit 46 such that a pulse will appear at the output of a delay circuit 46 corresponding to one time slot and at the time of the reply pulse 74. Therefore, only one of the AND circuits 41 through 44 and 39 will have applied thereto a time slot pulse at any time, and all the AND circuits 41 through 44 and 39 will have applied thereto a reply pulse when a reply pulse exists. In this manner, one of the AND circuits 41 through 44 and 39 will have an output which will cause its respective indicator 47 through 51 to indicate the occurrence of a reply pulse in a corresponding time slot, and therefore to indicate the continued presence of the corresponding protected object 14. The indicator means 47 through 51 may be of the hold type, in which case, after a number of pulses have been applied to the reset counter 52 by the counter 30, a pulse is applied to each of the indicators 47 through 51 to reset it. The reset pulse applied to the indicators 47 through 51 should be separated by a time period about equal to two or three times the time that it takes to scan all the time slots and therefore to scan all the protective units 20. If it is desired, however, the indicators 47 through 51 may be slow to release and stay on for the time it takes to scan all the protective units 20, in which case no resetting is necessary and the reset connection of the counter 52 may be omitted.

There may be as many protective means 20 for each sensor 16 as is desired, limited only by the size of the counters that one cares to make and the length of time desired for scanning. As illustrated, the time taken by one cycle of the power wave is necessary to ascertain the presence or absence of one protective unit 20. If it is desired to decrease the scanning time or increase the number of protected objects 14, two or more inquiry pulses and two or more reply pulses may be applied to the power wave, sufficiently out of phase so that they can be separated, whereby the scanning time is divided by the number of inquiry pulses, or the number of protected objects 14 is multiplied by the number of inquiry pulses applied to each cycle of the power waves. Since integrated circuit techniques may be used to build the protective circuit 20 (and the sensor 16), the protective circuit 20 may be very small and inexpensive.

The manner in which the reply pulses are made to fall into respective time slots is described in connection with FIGURES 3 and 4. Let there be N objects 14 to be protected, each having a protective circuit 20 therein. Then the counter 55 in the first of these units 20 will count X (see FIGURES 3 and 4) inquiry pulses 72, where X is equal to or greater than N, before the counter 55 fills up and sends out its reply pulse 74 at the time of the $X+A$ inquiry pulse 72 where A is a whole number. The counter 55 of another protective unit 20 will send out a reply pulse only after it has received X plus B inquiry pulses 72 where B is a whole number greater than A. The counter 55 of a third protective circuit 20 will send out a reply pulse 74 after receiving X plus C inquiry pulses 72 where C is greater than B and so forth, whereby each of the counters 55 will fill up and then send out a reply pulse upon counting a different number of inquiry pulses than any other counter 55 and not less than $X+A$. Therefore, when the described protective system is started up, each of the protective units 20 will send out a reply pulse 74 after having counted a different number, greater than X, of inquiry pulses 72 applied thereto, whereby the reply pulses 74 will all fall into different time slots and therefore will indicate the presence of the protected object in that time slot.

When a counter 55 has sent out its first and each subsequent reply pulse 74, see FIGURE 3, the reply pulse sets the respective counter 55 at a starting number S, see FIGURE 4, which is different for each counter 55. This starting number is such that for all the counters 55 the difference numbers obtained by subtracting the several starting numbers $S_1 \ldots S_n$ from the inquiry pulse count numbers $(X+A, X+B,$ etc.) that cause sending a reply pulse 74 are equal to the same number and are equal to the number X. Therefore, each reply pulse will fall into its own time slot as will be noted by a glance at FIGURE 3 in which the first reply pulses from the respective protective devices 20 occur at $X+1$, $X+2$, $X+3$, etc. inquiry pulses 72, and the second reply pulses occur at $2X+1$, $2X+2$, $2X+3$, etc. inquiry pulses. Subsequent reply pulses similarly occur in successive time slots. There will be an absence of a reply pulse or vacant time slot if the difference number is greater than the number of protective units 14. The counter 30 in the sensor 16 must count X inquiry pulses and must fill up and therefore be reset at the next inquiry pulse, the counter 30 pulses appearing in succession at the output terminals 32, 34, 36, 38, 40 thereof. Then only one AND circuit 41 through 44 and 39 will have two inputs applied thereto for any one protective device 20, whereby the presence or absence of a protected object will be evident at a glance at the indicators 47 through 51.

It may be desirable, as noted above, to reset the described system to zero periodically. This is accomplished by the production of a synchronizing signal by burst generator 53 and by its connection in the system. A pulse from the reset counter 52 is applied to the burst generator 53 whereby this generator applies a burst 76, see FIGURE 2, to the power wave 70 on the line 10. This burst 76 is applied to all protective units 20 and causes an output pulse to appear at the output of the integrating circuits 63, which pulse is lengthened in the pulse lengtheners 67 and applied to the reset terminals R of all the counters 55 to reset them to zero. Thereafter, the system operates as if it were just connected until a further burst 76 is applied to the protective units 20. At the sensor 16, AND circuit 39 is the only one that is energized by the counter 30 during the existence of the burst 76 whereby it may indicate the presence of the burst pulse 76. The indicators 47 through 51 are all reset after the burst 76 has expired due to the delay provided by the delay circuit 19. Furthermore, due to the construction of the pulse lengtheners 65 and 67, if a pulse is applied to the N input of a counter 55 simultaneously with the application of a pulse to the R input thereof, the N pulse ends before the R pulse ends, whereby the R pulse prevails and resets the counter 55 to zero.

Variations of the above-described protective systems will occur to a person skilled in the art. For example, a delay circuit 46 may be inserted between the output of the pulse generator 26 and the input of the counter 30, whereby only one delay circuit may be necessary instead of the plurality shown in the sensor 16. Or the burst generator 53 may be connected by a switch to the output of the reset counter 52, as shown, or to the output of the counter 30, whereby burst 76 may be applied to the system at will and at different intervals.

What is claimed is:
1. A protective system comprising:
   a plurality of protective units, and
   a central transmitting and sensing unit,
   means to plug said protective units and said central unit into a power line,
   said central unit comprising:
      a plurality of indicators,
      means to apply to said power line an inquiry pulse at a particular phase relation with respect to the power wave in said power line,
      means to receive reply pulses transmitted by said protective unit,
      means to distinguish between said reply pulses received in different time slots, and
      means to apply said reply pulses received in different time slots to different ones of said indicators,
   each of said protective units including:
      means to receive and count said inquiry pulses,
      means responsive to said receiving and counting means to provide a reply pulse,
      means to apply said reply pulse to the power wave in said power line at another phase relation with respect thereto, and
      means to apply said reply pulse to said counter to insert into said counter a starting number so chosen for said protective unit as to cause reply pulses provided by said protective unit to appear in a particular time slot.
2. A protective system comprising:
   a plurality of protective units, and
   a central transmitting and sensing unit, means to plug said protective units and said central
unit into a power line,
said central unit comprising:
a plurality of indicators,
means to apply an inquiry pulse to said power
line at a first particular phase relation with respect to the power wave in said power line,
means to receive reply pulses transmitted by said
protective unit,
means to count said inquiry pulses, and to apply
said reply pulses corresponding to different
counts of said inquiry pulses to different ones of
said indicators,
each of said protective units including:
means to receive and count said inquiry pulses,
means to provide a reply pulse upon counting a
predetermined number of inquiry pulses,
said predetermined number being different for
each protective unit,
means to apply all said reply pulses to said power
line and in a second particular phase relation
with respect to said power wave, said first and
second phase relation being different, and
means to apply the reply pulse produced in each
of said protective units to the counter included
in the said protective unit to set into the said
counter a starting number, said starting number being different for each protective unit and
said starting number being so chosen that for
all protective units, the difference between said
predetermined number and said starting number thereof is the same,
whereby received reply pulses from the several protective units cause indications by respective indicators at said central unit without the necessity
of transmitting a synchronizing pulse from the central unit to the protective units.

3. A protective system comprising:
a plurality of protective units,
a central transmitting and sensing unit,
means to plug said protective units and said central
unit into a power line,
said central unit including:
means responsive to a power wave applied from
said power line to said central unit to produce
an inquiry pulse at a first predetermined phase
relation with respect to said power wave,
means to receive reply pulses applied to said power
line by said protective units,
means to count said inquiry pulses,
means including said counting means to allocate
successively received reply pulses to different
time slots,
a plurality of indicators, and
means to apply reply pulses corresponding to different time slots to respective indicators,
each of said protective units including:
means to receive inquiry pulses,
means to count said inquiry pulses and to provide a
reply pulse upon counting a predetermined number of inquiry pulses,
said predetermined number being different for each
protective circuit,
means for applying said reply pulse to the power
wave in said power line in a predetermined phase
relationship with respect to an inquiry pulse,
means to apply said reply pulses produced in each
protective unit to the counter of said protective
unit and to set a starting number into said counter, said starting number being different for each
of the protective units,
said starting number being so chosen that the difference between the predetermined number and
the starting number for any protective unit is
equal to the difference between the predetermined number and the starting number for every
other protective unit.

4. A protective system comprising:
a plurality of protective units, and
a central transmitting and sensing unit,
means to plug said protective unit and said central unit
into a power line,
said central unit comprising:
a plurality of indicators,
means to apply an inquiry pulse to said power line
at a first particular phase relation with respect
to the power wave in said power line,
means to receive reply pulses transmitted by said
protective unit,
means to count said inquiry pulses and to apply
said reply pulses corresponding to different
counts of said inquiry pulses to different ones of
said indicators, and
means to send out a synchronizing signal at periodic intervals,
each of said protective units including:
means to receive and count said inquiry pulses,
means to provide a reply pulse upon counting a
predetermined number of inquiry pulses,
said predetermined number being different for each
protective unit,
means to apply all said reply pulses to said power
line and in a second particular phase relation
with respect to said power wave, said first and
second phase relations being different, and
means responsive to the reception of said synchronizing signal to reset said counting means,
whereby received reply pulses from the several protective units cause indications by respective indications at said control unit.

5. The invention described in claim 4 in which
means are provided at each of said protective units for
applying the reply pulse produced in a protective unit
to the counter therein to set into said counter a
starting number, said starting number being different for each protective unit and said starting numbers being so chosen that for all protective units, the
difference between said predetermined number and
said starting number thereof is the same, whereby
received reply pulses from the several protective units
cause indications of the respective indicators at said
control unit in the absence of a synchronizing signal.

References Cited

UNITED STATES PATENTS

| | | | |
|---|---|---|---|
| 3,044,065 | 7/1962 | Barney et al. | 328—48 |
| 3,214,734 | 10/1965 | Whitehead | 340—408 |
| 3,388,389 | 6/1968 | Hendriques | 340—310 X |
| 3,390,340 | 6/1968 | Newman et al. | 328—48 |
| 3,407,400 | 10/1968 | Lurie | 340—280 |

JOHN W. CALDWELL, Primary Examiner

P. PALAN, Assistant Examiner

U.S. Cl. X.R.

340—280, 310